(12) United States Patent
Möckel et al.

(10) Patent No.: US 8,789,401 B2
(45) Date of Patent: Jul. 29, 2014

(54) METHOD FOR PRODUCING A SUPPORT ROLL FOR A ROLLING MILL

(75) Inventors: Jörg Möckel, Chemnitz (DE); Achim Klein, Kreuztal (DE); Heinz-Adolf Müller, Wilnsdorf (DE); Jochen Münker, Kreuztal (DE); Jörn Sohler, Kreuztal (DE); Maik Berger, Chemnitz (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 0 days.

(21) Appl. No.: 13/086,700

(22) Filed: Apr. 14, 2011

(65) Prior Publication Data

US 2011/0192029 A1    Aug. 11, 2011

Related U.S. Application Data

(62) Division of application No. 11/921,582, filed as application No. PCT/EP2006/006557 on Jul. 5, 2006.

(30) Foreign Application Priority Data

Jul. 7, 2005 (DE) .......................... 10 2005 032 126
Jan. 20, 2006 (DE) .......................... 10 2006 002 773

(51) Int. Cl.
*B21B 27/03* (2006.01)
*B21B 27/00* (2006.01)

(52) U.S. Cl.
USPC ................................. 72/252.5; 492/1; 492/48

(58) Field of Classification Search
USPC ............ 72/200, 201, 252.5, 243.6; 492/1, 47, 492/48
See application file for complete search history.

(56) References Cited

U.S. PATENT DOCUMENTS

| | | | | | |
|---|---|---|---|---|---|
| 242,058 | A | * | 5/1881 | Schurmann | 492/6 |
| 2,187,250 | A | * | 1/1940 | Sendzimir | 72/241.4 |
| 2,543,507 | A | * | 2/1951 | Rancourt | 242/609.2 |
| 2,671,262 | A | * | 3/1954 | Kuniholm | 492/47 |
| 4,407,151 | A | * | 10/1983 | Gronbech | 72/243.6 |
| 4,416,137 | A | * | 11/1983 | Marshall | 72/241.2 |
| 4,683,744 | A | | 8/1987 | Ginzburg et al. | |
| 4,793,172 | A | * | 12/1988 | Eibe | 72/200 |
| 5,001,820 | A | * | 3/1991 | Yoshida et al. | 492/2 |
| 5,347,837 | A | | 9/1994 | Ginzburg et al. | |
| 2002/0104358 | A1 | * | 8/2002 | Hart | 72/251 |

FOREIGN PATENT DOCUMENTS

| | | |
|---|---|---|
| DE | 1602121 | 4/1970 |
| DE | 19702325 A1 | 7/1998 |
| EP | 0896841 A2 | 2/1999 |
| EP | 0937515 A1 | 8/1999 |

(Continued)

OTHER PUBLICATIONS

Patent Abstracts of Japan, BD. 009, No. 268 (M-424), Oct. 25, 1985 & JP 60 115 312 A (Ishikawajima Harima Jokogyo KK), Jun. 21, 1985.

*Primary Examiner* — Debra Sullivan
(74) *Attorney, Agent, or Firm* — Lucas & Mercanti, LLP; Klaus P. Stoffel

(57) ABSTRACT

Disclosed is a support roll for a rolling mill, such as a plate rolling mill, flat rolling mill, or similar, comprising a jacket and a roll shaft which is embodied in several parts. The invention also relates to a method for producing a support roll.

6 Claims, 4 Drawing Sheets

(56) References Cited

FOREIGN PATENT DOCUMENTS

| EP | 1056553 | B1 | 12/2000 |
| EP | 1058616 | B1 | 12/2000 |
| JP | 60096308 | | 5/1985 |
| JP | 60115312 | A | 6/1985 |
| JP | 03095104 | | 9/1991 |

* cited by examiner

US 8,789,401 B2
METHOD FOR PRODUCING A SUPPORT ROLL FOR A ROLLING MILL

CROSS-REFERENCE TO RELATED APPLICATIONS

The present application is a Divisional Application of U.S. patent application Ser. No. 11/921,582, filed Dec. 5, 2007, which is a 371 of International application PCT/EP2006/006557, filed Jul. 5, 2006, which claims priority of DE 10 2005 032 126.7, filed Jul. 7, 2005, and DE 10 2006 002 773.6, filed Jan. 20, 2006, the priority of these applications is hereby claimed and these applications are incorporated herein by reference.

BACKGROUND OF THE INVENTION

The invention concerns a support roll for a rolling mill, such as a plate rolling mill, sheet rolling mill or the like, which consists of a shell and a roll shaft/roll spindle, and a method for producing a support roll of this type.

Previously known support rolls for multiple-high rolling stands for hot rolling or cold rolling on a flat track are produced as a single part. To produce support rolls that weigh more than 120 t, which are used especially in plate rolling stands, two possible means of production are known:

(a) The support roll is cast and then forged in an open-die forge and then worked.—single-component roll—

(b) The support roll is cast by composite casting techniques and consists of hard, wear-resistant material in the barrel region and of high-grade tough material with high bending fatigue strength in the neck and core regions. This is followed by mechanical working.—multiple-component roll—

There are only a few manufacturers of single-part support rolls that weigh more than 170 t, and this means long delivery times and high prices.

Support rolls of this type have the further disadvantage of high shipping costs due to the large weights.

Furthermore, the entire roll body must be scrapped when the useful barrel region (constructed to be wear-resistant) becomes worn.

Besides the single-part support rolls, multipart support rolls are also known.

EP 1 056 553 B1 describes a rolling mill with work rolls and multipart support rolls that consist of a main roll body with several roller bearings installed on it side by side in its longitudinal direction, whose outer rings support a rotatable shell that encompasses the roller bearings. The inner surface of the shell rests with full contact on the outer surfaces of the outer rings of the roller bearings. The outer surface forms the roll barrel of the support roll, and three roller bearings are provided on the length of the main roll body, of which the middle roller bearing is designed as a conical roller bearing. The two outer roller bearings are designed as cylindrical roller bearings, and an eccentric bushing that can be rotated by a motor about the longitudinal axis of the main roll body is installed between each of the two cylindrical roller bearings and the main roll body, such that a self-adjustable tilting segment that allows skewing of the cylindrical roller bearing is provided in the load region of the main roll body between the main roll body and each eccentric bushing.

German Early Disclosure 1 602 121 describes a multipart support roll for four-high rolling stands for rolling out flat metal products, in which the rolling forces to be absorbed by the support roll are transmitted from the cylindrical surface of the support roll to the spindle or shaft in only two places within the width range of the roll barrel.

EP 0 896 841 A2 discloses a rolling mill with work rolls and multipart support rolls that consist of a main roll body with several roller bearings installed on it side by side in its longitudinal direction, whose outer rings support a rotatable shell that encompasses the roller bearings. The outer surface forms the roll barrel of the support roll, where the main roll body can rotate about its longitudinal axis and is divided into cylindrical sections that have approximately the same width as the roller bearings. The parallel axes of these adjacent cylindrical sections are offset relative to each other. The inner surface of the shell rests with full contact on the outer surfaces of the outer rings of the roller bearings and in this way is provided with an eccentricity that results from the eccentricity of the sections of the main roll body, reduced by the opposing bending effect of the shell.

An arrangement of this type is also described in EP 1 058 616 B1.

DE 197 02 325 A1 discloses a method for producing vibration-damped rolls. In this method, to change the values of the natural frequencies of at least one roll, at least one cavity that is parallel to the axis is formed in at least one support roll and/or an associated work roll. In a set of rolls of the invention, which consists of at least a work roll and support roll, at least one roll is provided with at least one cavity that is parallel to the axis.

EP 0 937 515 B1 discloses a roll that consists of a rotating roll jacket and means, which are installed inside the roll jacket, for controlling the flexural rigidity of the roll jacket. The control means consist of a sliding bearing in the form of a rotatable body, which can be rotatably adjusted and is shaped in such a way that its load-bearing surface corresponding to the loaded zone of the roll jacket is part of the cylindrical outer surface of a rotationally symmetric body, and the boundary of this cylindrical outer surface is formed in such a way that the width and/or position of the load-bearing surface varies along the circumference of the rotatable body. In the region of its load-bearing surface, the rotatable body has at least one recess. The course of the boundary of this recess and its inner contour can be shaped in any desired way.

These previously known multipart embodiments or designs of support rolls are constructed as shell rolls, i.e., an outer sleeve or the like rotates about an inner shaft, spindle or the like.

Support rolls with a large total weight that are produced by these previously known methods have the same disadvantages with respect to shipping, etc., as a single-part support roll.

SUMMARY OF THE INVENTION

Therefore, the objective of the invention is to simplify production of the known support rolls, shorten the delivery time, increase the service life, and reduce the aforementioned disadvantages, such as high shipping costs.

In accordance with the invention, the solution to this problem is characterized by the fact that, in a support roll for a rolling mill, such as a plate rolling mill, sheet rolling mill or the like, which consists of a shell and a roll shaft/roll spindle, the roll shaft/roll spindle is constructed from multiple parts.

Additional embodiments of the support roll are revealed in the pertinent dependent claims.

In a further development of the invention, one or more bores are provided in the half-journals. The half-journals run parallel to the axis and are, for example, symmetrically arranged. If only one bore is provided, the axis of the bore is identical with the longitudinal axis of the half-journal.

In a first embodiment, both half-journals are formed with through bores, into which a tension bar/tie rod is inserted to pretension the two half-journals with respect to each other.

In another embodiment, one half-journal is provided with through bores, and the other half-journal is provided with threaded bores, into which threaded rods/pretensioning bolts are turned.

In a first embodiment, the half-journals are cylindrically shaped in the region that is surrounded by the shell. In another embodiment, this region is designed in the form of a conical frustum. In this regard, for example, a conical seat is provided, which has a small conical angle and a self-locking design. In another embodiment, a bushing is provided between the two half-journals. This bushing makes it possible to produce support rolls of different lengths with the same half-journals. The different lengths of the shells are bridged by one or more adapted bushings.

For further simplification, a bushing can be designed with the threaded bore or threaded bores. The half-journals are then designed only with through bores.

The invention also concerns a method for producing a support roll that consists of a shell and a multipart roll shaft/roll spindle.

In accordance with the production method of the invention, the shell is internally heated and thus expands. The half-journals are then inserted into the shell and pushed up against the right and left end walls of the shell. To achieve exact positioning, the half-journals have, for example, at least one locating edge on their circumference. The support roll, which consists of the shell, right half-journal, and left half-journal, is held together by a shrink fit after the shell has been cooled. A support roll of high flexural rigidity is obtained.

In one embodiment the outer surface of the shell is provided with a wear-resistant buildup weld.

When the shell has reached an established wear limit, the two half-journals and, if necessary, the pretensioning bolt or bolts are removed from the shell. Due to the construction of the support roll in accordance with the invention, the right half-journal, the left half-journal, and the pretensioning bolt or bolts can be reused.

Due to the embodiments of the support roll in accordance with the invention with a shell, right half-journal, left half-journal, and pretensioning bolt or bolts, etc., there is the further advantage that these individual parts can be shipped separately to the installation site, a rolling mill or the like. The support roll is then put together/assembled on site.

The various features of novelty which characterize the invention are pointed out with particularity in the claims annexed to and forming a part of the disclosure. For a better understanding of the invention, its operating advantages, specific objects attained by its use, reference should be had to descriptive matter in which there are described preferred embodiments of the invention.

DETAILED DESCRIPTION OF THE INVENTION

Figure 1:
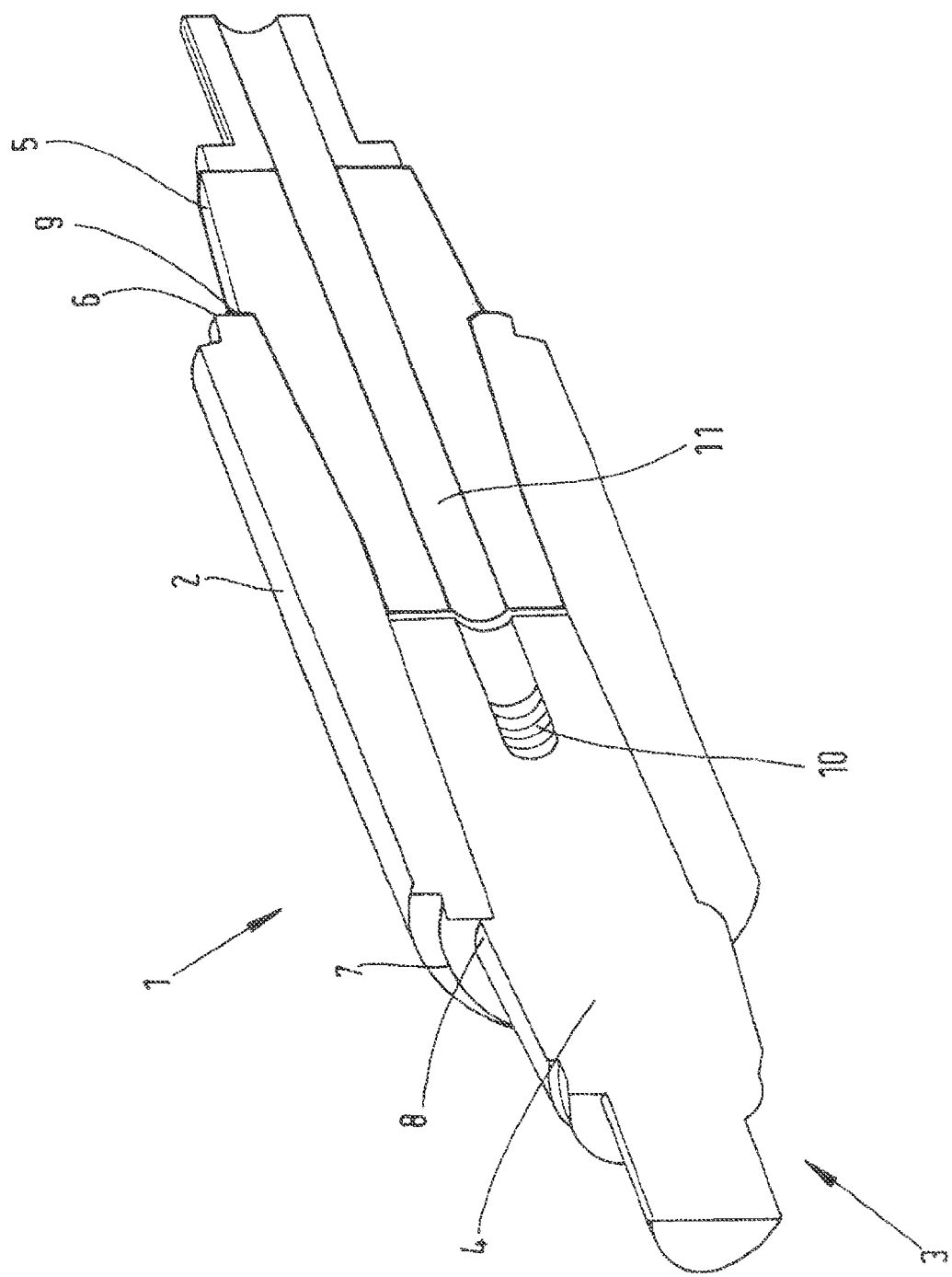
FIG. 1 shows a perspective sectional view of a multipart support roll.

FIG. 1 shows a perspective sectional view of a support roll 1. The support roll 1 consists of a shell 2 and a roll shaft/roll spindle 3. In accordance with the invention, the roll shaft/roll spindle 3 is formed by a left journal 4 and a right journal 5. Holding fixtures for bearings are formed at the outer ends.

The inside of the shell 2 is designed in the form of a conical frustum, starting at each of the end faces 6, 7. To achieve better positioning of the journals 4, 5 in the shell 2, the journals 4, 5 are provided with a stop edge 8, 9.

In the illustrated embodiment, the left journal 4 has a threaded bore 10, while the right journal 5 is provided with a through bore 11, through which a pretensioning bolt (not shown) is passed.

Figure 2:
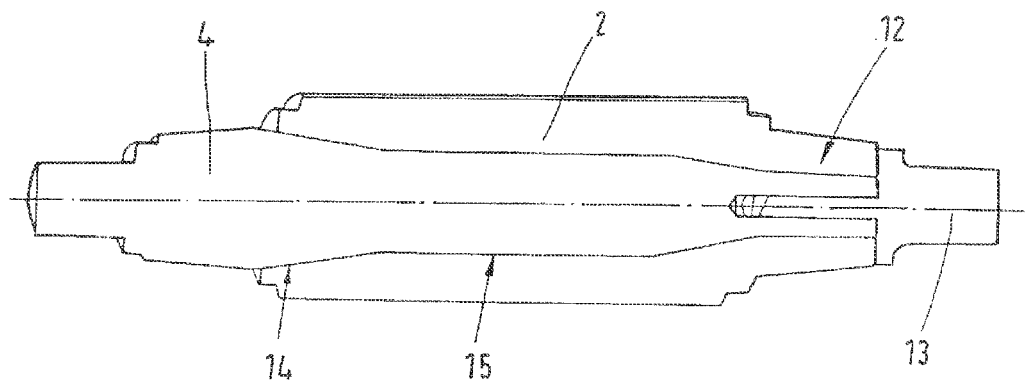
FIG. 2 shows a perspective sectional view of a support roll of the invention, in which the shell is designed with a journal.

Another embodiment is shown in FIG. 2. The left journal 4 is designed in such a way that it is installed in the shell 2 over a great length. The shell 2 is formed at its right end, for example, with a journal 12, which is cast on or forged on at one end. The left journal 4 and the shell 2 are joined by means of combined conical shrink fit 14 and/or cylindrical shrink fit 15. This three-part support roll is held together by a pretensioning bolt 13. The left journal 4 directly receives a journal bearing (not shown).

The advantage of this design is that due to the long joint of the parts with each other (left journal 4 in the shell 2), the deflection curve bending lines of the two parts are compensated, and thus the stresses and deformations are within permissible limits.

Figure 3:
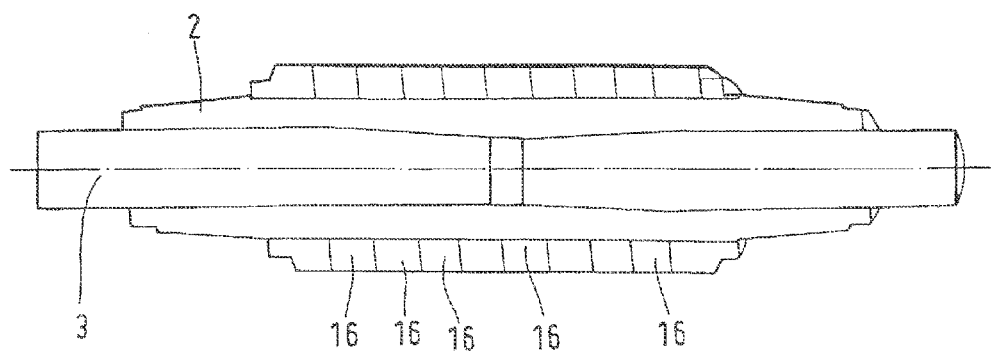
FIG. 3 shows a perspective sectional view of a support roll of the invention with barrel or shrink rings.

To avoid having to make a complete exchange of a damaged or worn shell 2, barrel or shrink rings 16 are shrink-fitted over the entire length of the barrel, as shown in FIG. 3. In this regard, several equally wide or variably wide barrel or shrink rings 16 are shrink-fitted onto graduated cylindrical diameters of the shell 2. An advantage of this is the possibility of shrink-fitting new barrel or shrink rings 16 when these have reached the end of their usable diameter after repeated regrinding. The shell 2 can be used again.

Figure 4:
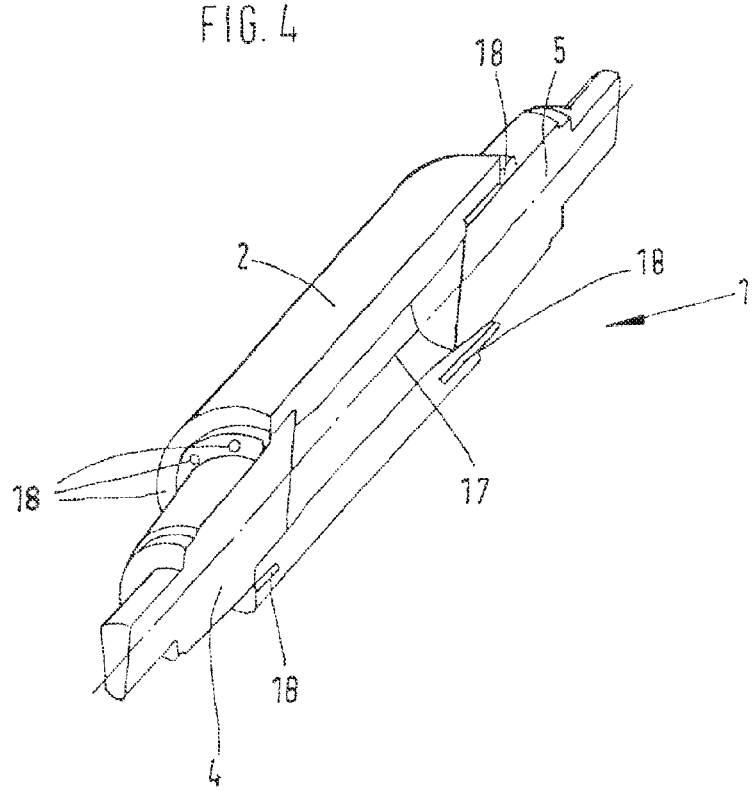
FIG. 4 shows a perspective sectional view of a support roll with a cavity.

In FIG. 4, the support roll 1 consists of the shell 2 and the journals 4, 5, which are inserted only a short distance into the shell 2. This results in the formation of a cavity 17 in the shell 2. The journals 4, 5 are, for example, pressed in by means of an easy cylindrical or conical fit in the shell 2. To secure the connection, the journals 4, 5 are bolted with the shell at both ends by a sufficient number of bolts 18. The advantage of this embodiment is the possibility of reusing the left journal 4 and the right journal 5 when the outside diameter of the shell has been ground down to the point that it has reached the end of its predetermined usable diameter. The equipment for changing the support roll 1 can be designed with smaller dimensions, because the whole support roll 1 is lighter than a solid roll.

Figure 5:
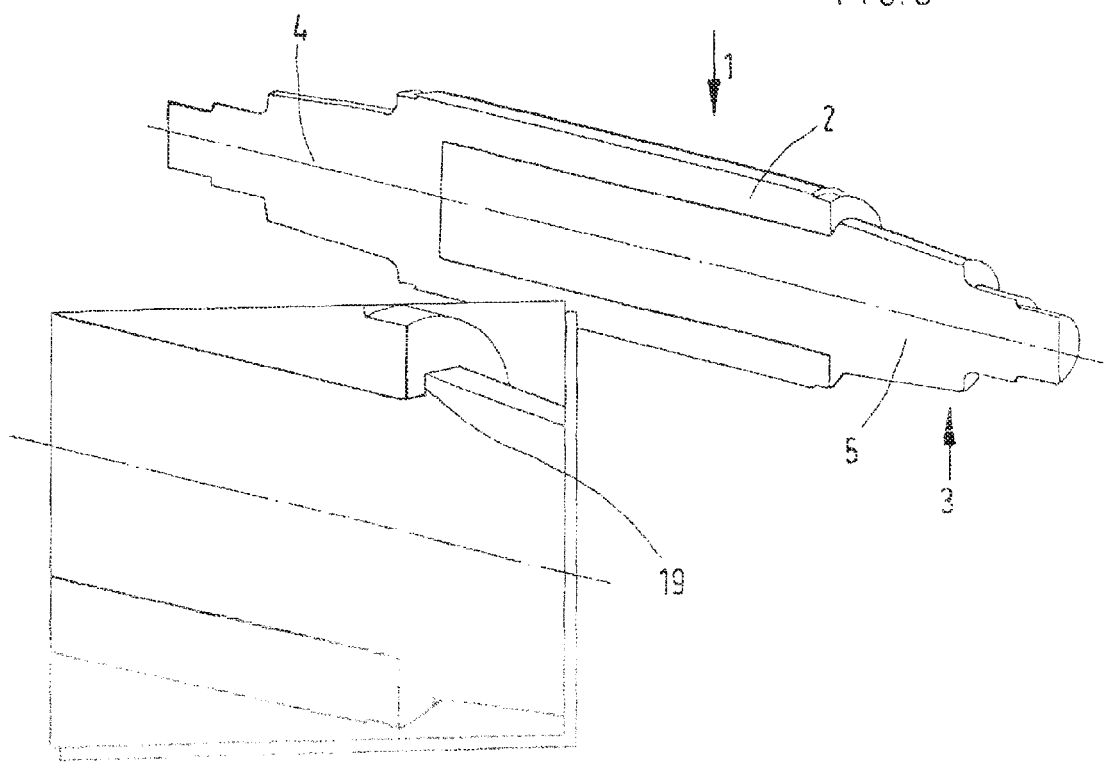
FIG. 5 shows a perspective sectional view of a two-part embodiment.

As illustrated in FIG. 5, a multipart roll shaft/roll spindle 3 in a support roll 1 is realized by forming the left journal 4 as a single part with the shell 2. The right journal 5 has a stop face 19 to allow proper positioning of the two parts. The two parts are joined after the cylindrical shell has first been heated. After insertion of the journal 5, followed by cooling, a strong joint is present in the form of a transverse press fit. Due to the action of friction, sufficient fixation of the axial position is guaranteed. The connection is additionally secured, as described above, by means of a pretensioning bolt or several pretensioning bolts. The use of a pretensioning bolt or bolts is helpful during the assembly of the support roll.

Figure 6:
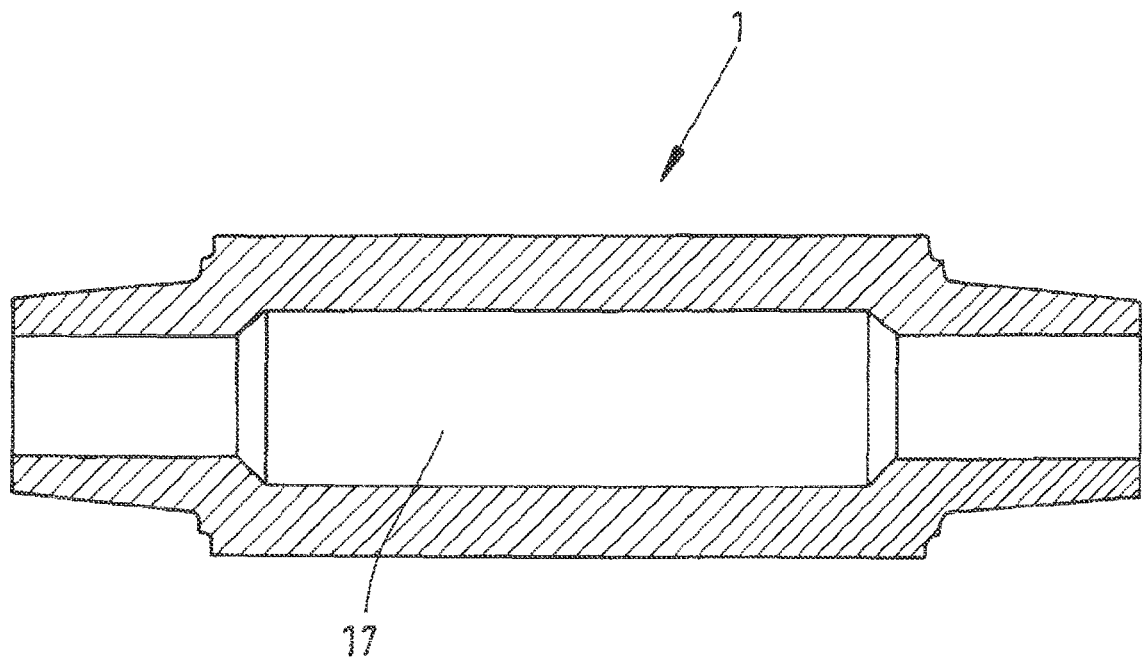
FIG. 6 shows a sectional front view of a variant of a support roll according to FIG. 4.

FIG. 6 shows a possible variant of the embodiment of a support roll shown in FIG. 4. The shell 2 consists of a cast hollow body or a hollow body that is forged over a mandrel. The ends of the shell are already formed as a single part with regions for holding bearings. The actual journals of the roll shaft/roll spindle 3 (not shown) are again secured by means of bolts and/or a joint seat. The advantage of this embodiment is that the weight of the support roll is reduced.

While specific embodiments of the invention have been shown and described in detail to illustrate the inventive principles, it will be understood that the invention may be embodied otherwise without departing from such principle.

We claim:

1. A method for producing a support roll, comprising the sequential steps of: internally heating a shell; inserting a right half-journal and a separate left half-journal in the shell in a self-locking manner, whereby locating edges of each half-journal are positioned against first and second end faces of the shell, respectfully; and cooling the shell so the shell is held together with the left and right half-journals by a shrink fit, wherein an interior of the shell surrounding the left half-journal and the right half-journal is formed as a conical frustum starting at each of the end faces of the shell with a self-locking design and wherein the left half-journal and the right half-journal have a frusto-conical shape corresponding to the interior of the shell.

2. The method in accordance with claim 1, wherein the right half-journal and the left half-journal are pretensioned with respect to each other by at least one tie rod or pretensioning bolt.

3. The method in accordance with claim 2, wherein the tie rod or pretensioning bolt is screwed into a threaded bore, which is formed in one of the two half-journals.

4. The method in accordance with claim 1, wherein at least one bushing is mounted inside the shell between the half-journals.

5. The method in accordance with claim 1, wherein an outer surface of the shell is provided with a wear-resistant buildup weld.

6. The method in accordance with claim 1, wherein the half-journals extend into the shell so as to together extend along substantially an entire axial length of the shell.

* * * * *